P. K. WOOD.
SAND GUARDED SHAFT BEARING.
APPLICATION FILED MAR. 18, 1914.
1,199,141.
Patented Sept. 26, 1916.
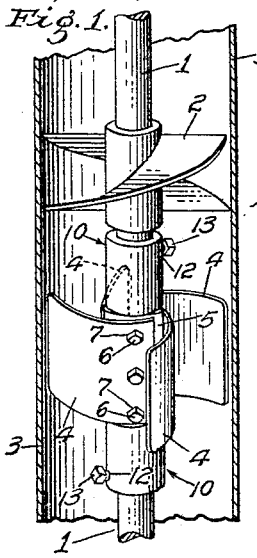
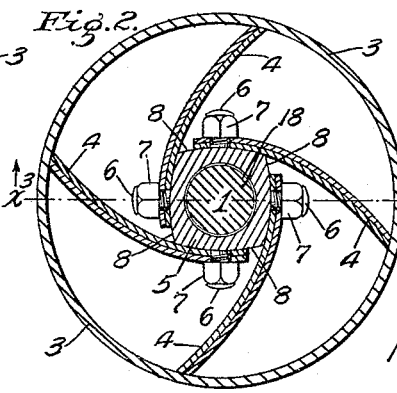
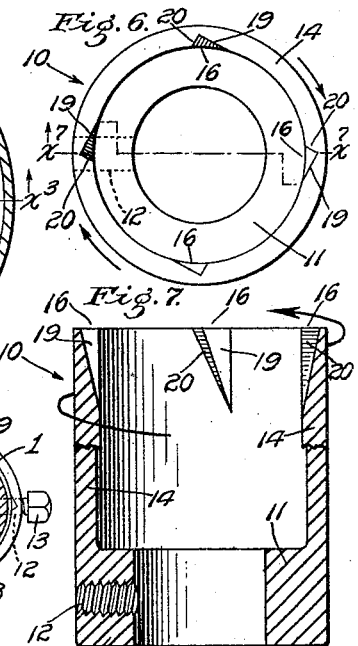
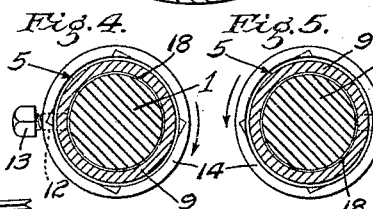
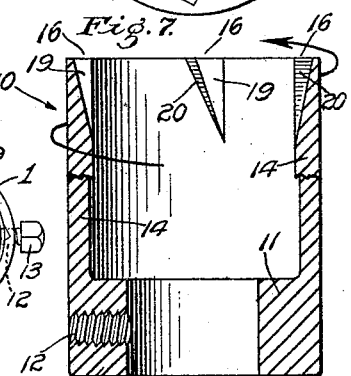
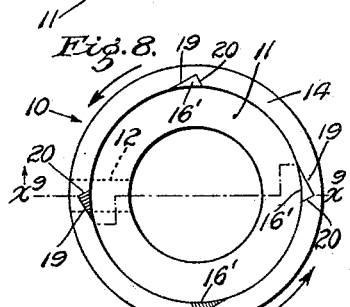
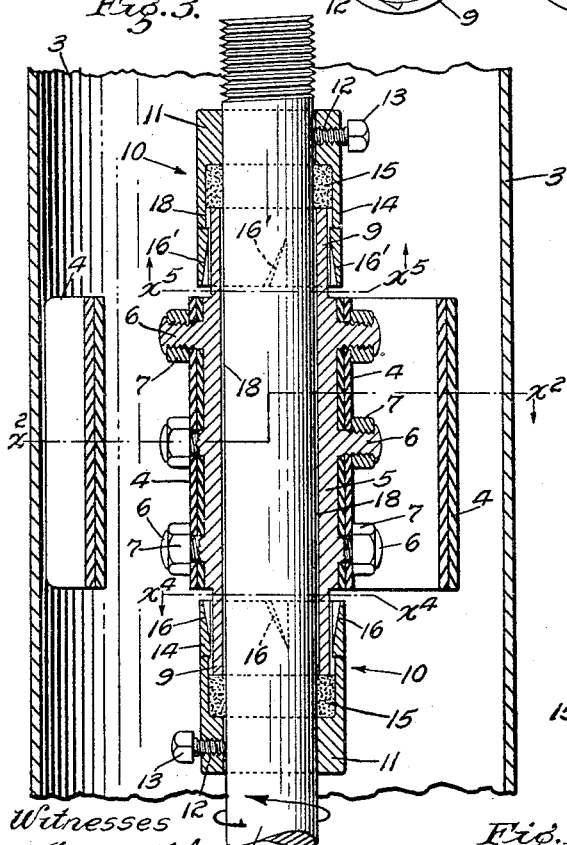
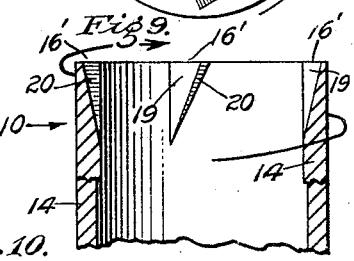
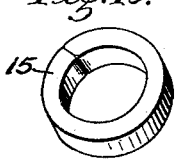
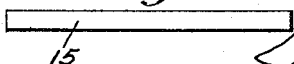
Witnesses
Inventor
Preston K. Wood
by
James R. Townsend
his Atty.

UNITED STATES PATENT OFFICE.

PRESTON K. WOOD, OF LOS ANGELES, CALIFORNIA.

SAND-GUARDED SHAFT-BEARING.

1,199,141.   Specification of Letters Patent.   Patented Sept. 26, 1916.

Application filed March 18, 1914. Serial No. 825,695.

*To all whom it may concern:*

Be it known that I, PRESTON K. WOOD, a citizen of the United States, residing at Los Angeles, in the county of Los Angeles and State of California, have invented a new and useful Sand-Guarded Shaft-Bearing, of which the following is a specification.

This invention relates to means for supporting rotating submerged shafts and is particularly designed for use in what is known as propeller pumps and the like, in which a vertical shaft extends down through a well casing or pipe tubing to rotate the elements that cause the liquid to flow through said casing.

Objects of the invention are to provide a novel construction that will be easily applied to such vertical shafts or other shafts where the bearing may be serviceable and which will practically exclude from between rotating parts any sand or other gritty substances which might cause the parts to wear.

Another object is to make provision whereby the life of the packing at the joint between the relatively rotating elements will be indefinitely prolonged.

The invention may be variously applied and is regarded as pioneer in the art in various features among which may be mentioned: First, the packing is arranged to rotate with the shaft and in this way there is no wear between the packing and the shaft; second, provision is made for centrifugal discharge of liquid from the gland that incloses the packing, thus to prevent grit from reaching the packing; third, the bearing is more easily constructed and is made more secure and permanent, and its wings are easily replaceable.

The various objects, advantages and features of novelty may more fully appear from the accompanying drawings and the subjoined detail description.

The accompanying drawings illustrate the invention.

Figure 1 is a fragmental elevation showing the embodiment of the invention in a propeller pump. Fig. 2 is a plan section on line $x^2$, Fig. 3. Fig. 3 is a vertical section on line $x^3$, Fig. 2. Fig. 4 is a plan section on line $x^4$, Fig. 3, showing the lower rotating centrifugal sand excluding gland in place around the bearing box end and the shaft. Fig. 5 is a sectional view analogous to Fig. 4 looking up at the lower end of the upper rotating gland from line $x^5$, Fig. 3. Fig. 6 is a plan looking down into the open end of the lower gland. Fig. 7 is an irregular axial section of the lower gland on line $x^7$, Fig. 6. Fig. 8 is a view looking up into the open end of the upper gland. Fig. 9 is a fragmental axial section of the upper gland on irregular line $x^9$, Fig. 8. Fig. 10 is a perspective view of the packing detached. Fig. 11 is a plan view of a detached woolen felt strip for forming the packing at the ends of the box.

The shaft 1 is of any suitable construction and in the instance illustrated is adapted to carry a propeller 2 that is adapted to rotate inside the casing or tubing 3 against the inside of which impinges the supporting wings 4 that are fixed to the bearing box 5 by means of threaded studs 6 and nuts 7; the studs 6 being cast integral with the bearing box 5 and the outer ends of said studs being riveted on the nuts to fix them in place after the wings 4 have been applied and the nuts 7 screwed home.

This construction makes a very light, simple, strong support for the shaft, the wings 4 being made of resilient metal and there being nothing in the process of fixing the wings to the bearing box that will impair the quality of the wings which must be resilient in order to enter the casing and to engage the casing so as to hold the box in axial alinement with the casing and yet allow the box to be slipped along inside the casing as is necessary in the operation of installing the pump.

The box 5 has a number of flat faces 8 in angular relation to each other, one face for each wing and preferably there are four faces and four wings for the reason that in this way the box may afford maximum supporting surface for the wings with minimum amount of metal and allow the wings to project tangentially to most effective resilient engagement with the casing.

The advantage of the foregoing construction is clearly understood by reference to my earlier patent for rotary pump, No. 616,646, dated Dec. 27, 1898, in which the box is cylindrical so that the wings are free to bend around the periphery of the box and minimize their clamping and supporting effect, whereas this present construction stiffens the inner ends of the wings so as to maximize the frictional value between the wings and tube, thereby maximizing the supporting effect.

The reduced ends 9 of the box are cylindrical and are surrounded by complementary glands 10 provided with a thickened head or inwardly projecting collar 11 provided with a threaded seat 12 for a set-screw 13. Said gland is in the form of a cup having thin cylindrical walls 14 surrounding and preferably deeper than the cylindrical ends 9; the space next to the collar 11 being filled with a thick packing band 15 which may be made of a thick strip of woolen felt.

The open ends of the glands are provided on the insides of their walls with means to centrifugally expel liquid from the interior of the gland when the gland is rotating with the shaft.

In order to provide such means the inside of the thin gland walls 14 are provided with notches 16 and 16', notches 16 being in one gland and notches 16' being in the other gland, said notches being shown spirally arranged in reverse directions as viewed from the open ends of the gland respectively as indicated in Figs. 4 and 5, the purpose being to expel from the space inside said walls the liquid that would otherwise find its way through the space 18 to the box and the shaft. The forward face 19 of each notch is tangentially arranged and the rearward face 20 of each notch is practically radially arranged, being preferably arranged at right angles to said forward face, and said notches deepen outwardly. In consequence of which, when the shaft having the glands and the propellers thereon is rotating and water is being pumped through the casing the rear faces of the notches which practically form shoulders or projections will cause the water to rotate with the glands and as the notches deepen outward toward the upper ends of the gland the centrifugal force finds expression by driving the water outward away from the shaft and consequently out of the space between the walls of the gland and the cylindrical ends of the box.

It is understood that liquid will penetrate by capillary attraction or otherwise to the space between the box and the shaft, and such liquid will lubricate the bearing but the construction shown in this application practically prevents any current of liquid from passing into the space between the shaft and the box and therefore excludes the grit such current of liquid would otherwise be liable to carry into the space between the shaft and the box. This liability is entirely avoided by the construction shown so that no sand or grit will be washed through the packing.

I claim:—

1. The combination with a shaft, of a box therefor having faces angularly arranged relative to each other and each face being provided with a number of studs and said studs being screw-threaded; of wings fitting on the faces and over the studs; nuts screwed on the studs and fixing the wings in place; said studs being riveted onto said nuts; the box and the casing with which the wings resiliently engage being concentric; said box being centrally bored and provided with cylindrical ends, glands for said ends respectively, said glands being fixed to the shaft and rotating with the shaft; packing within the glands between the head thereof and the cylindrical ends; said glands being provided with means to set up centrifugal motion in liquid, finding its way into said glands for the purpose of expelling liquid from between the gland and box, and for the purpose of preventing liquid from entering between the box and the shaft.

2. The combination with a shaft and a box therefor, said box being provided with cylindrical ends; of a gland fixed to the shaft and provided with walls surrounding the cylindrical ends of the box, said walls being provided with means circumferentially of said ends to set up centrifugal force in liquid inside the gland, thus to expel liquid from the gland and excluding it from between the box and the shaft when the shaft rotates.

3. The combination with a shaft, of a gland fixed thereto, a box around the shaft and extending into the gland, and means surrounding the end of the box inside the gland operative when the shaft rotates to expel water from the gland by centrifugal force.

4. The combination with a shaft and a box therefor, of a gland surrounding one end of the box and provided with internal notches in the open end of the gland operative when the shaft rotates to set up centrifugal force to expel liquid from the gland, thereby to exclude liquid from between the shaft and the box.

5. The combination with a shaft, of a box around the shaft, glands surrounding the ends of the box and provided internally with reversely arranged means for expelling liquid from the gland so that when the shaft is rotated in one direction liquid will be expelled from both boxes.

6. The combination with a shaft, of a bearing box therefor, glands surrounding the ends of the bearing box and reversely notched on their inner faces to set up centrifugal action to expel liquid from between the glands and the box when the shaft is rotating.

7. A packing gland provided internally at its open end with notches to set up centrifugal action to expel liquid from the gland when the same is rotated.

8. A packing gland provided internally at its open end with shoulders to set up centrifugal action to expel liquid from the gland when the same is rotated.

9. The combination with a box having cylindrical ends, of packing fitting against said ends, a shaft within the box, and a gland rotating with the shaft and compressing the packing against the end of the box; the packing rotating with the gland and the shaft and contacting only with the end of the box, thus minimizing wear on the packing.

10. The shaft bearing set forth comprising a box around the shaft; a casing around the box; the box being provided with angularly arranged faces provided with studs integral therewith; wings seated on the studs and faces; and nuts on the studs to hold the wings in place; the studs being riveted onto the nuts and the wings resiliently engaging the casing.

11. In combination, a shaft, a box for the shaft, a gland rotating with the shaft and provided with packing resting against the end of the box, and means in the gland to prevent circulation of liquid adjacent said packing.

12. In combination, a shaft, a box for the shaft, a packing band resting against one end of the box, and means rotating with the shaft to drive liquid centrifugally away from said packing band.

13. In combination, a shaft, a box for the shaft, a gland having one end closely fitting the shaft and turning therewith and having its other end spaced apart from the shaft and surrounding one end of the box, and means at the spaced apart end of the gland to prevent the circulation of grit and sand through said spaced apart end.

In testimony whereof, I have hereunto set my hand at Los Angeles, California, this 11th day of March 1914.

PRESTON K. WOOD.

In presence of—
 JAMES R. TOWNSEND,
 L. BELLE WEAVER.

Copies of this patent may be obtained for five cents each, by addressing the "Commissioner of Patents, Washington, D. C."